P. A. YATZUK.
POTATO DIGGER.
APPLICATION FILED AUG. 19, 1918.

1,300,090.

Patented Apr. 8, 1919.
3 SHEETS—SHEET 1.

Inventor
Peter A. Yatzuk.
By his Attorney

P. A. YATZUK.
POTATO DIGGER.
APPLICATION FILED AUG. 19, 1918.

1,300,090.

Patented Apr. 8, 1919.

Inventor
Peter A. Yatzuk.
By his Attorney

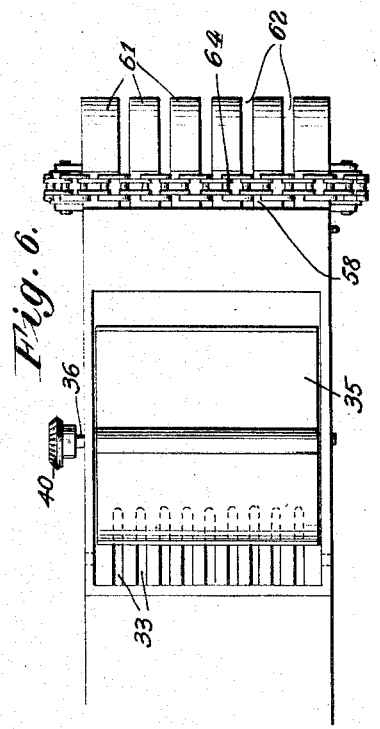
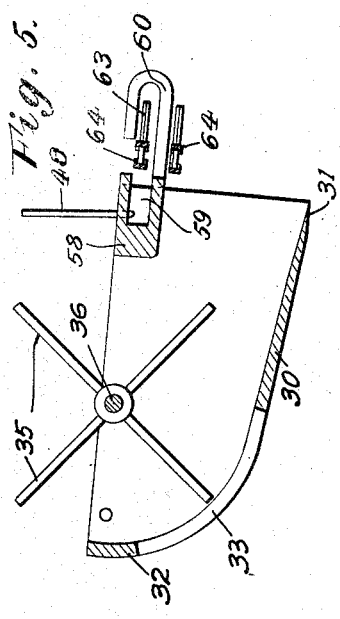
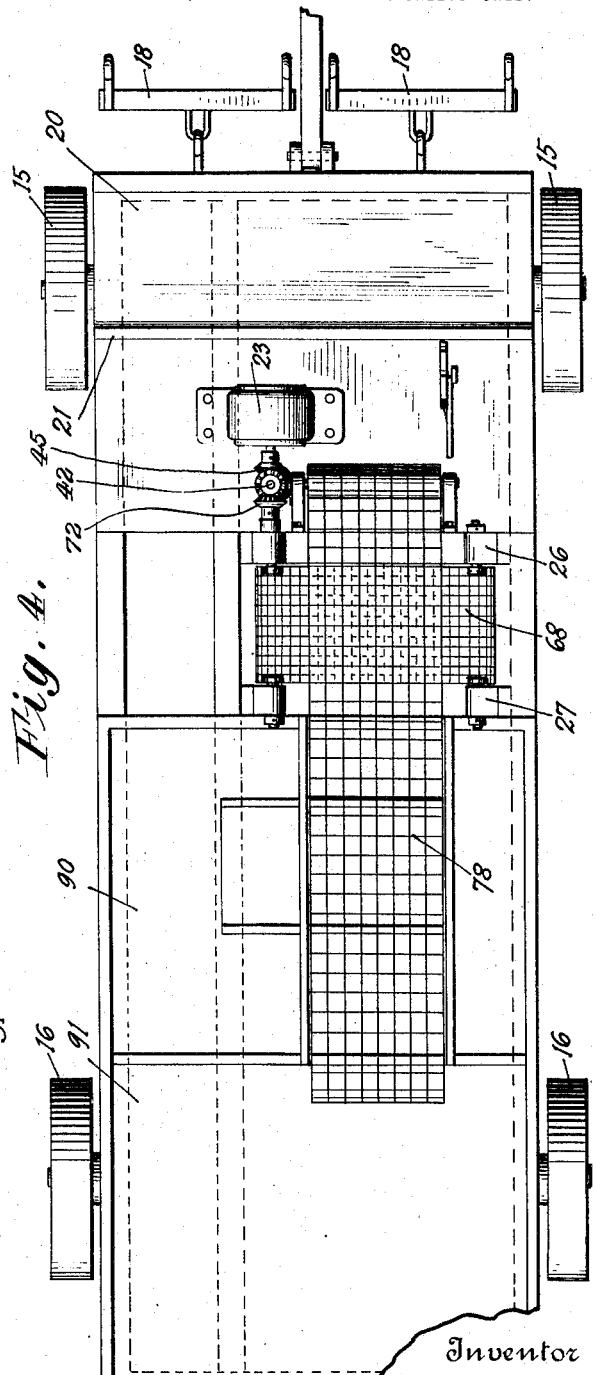

UNITED STATES PATENT OFFICE.

PETER A. YATZUK, OF WATERBURY, CONNECTICUT.

POTATO-DIGGER.

1,300,090.    Specification of Letters Patent.    Patented Apr. 8, 1919.

Application filed August 19, 1918. Serial No. 250,481.

*To all whom it may concern:*

Be it known that I, PETER A. YATZUK, a citizen of Russia, residing at Waterbury, county of New Haven, and State of Connecticut, have invented certain new and useful Improvements in Potato-Diggers, of which the following is a specification.

This invention relates to improvements in agricultural implements, and particularly to types adapted for use in digging potatoes.

The principal object of the invention is to provide a portable implement capable of passing over a potato field, raising the potatoes from the ground, separating the soil from the tubers, conveying and assorting the potatoes according to sizes and delivering the same into receptacles carried by the implement.

This object is accomplished by the novel construction and combination of parts hereinafter described and shown in the accompanying drawings, forming material part of this disclosure and in which—

Fig. 4 is a top plan view of the entire implement.

Fig. 5 is an enlarged vertical sectional view of the scoop or shovel, and

Fig. 6 is a top plan thereof.

Figure 1:
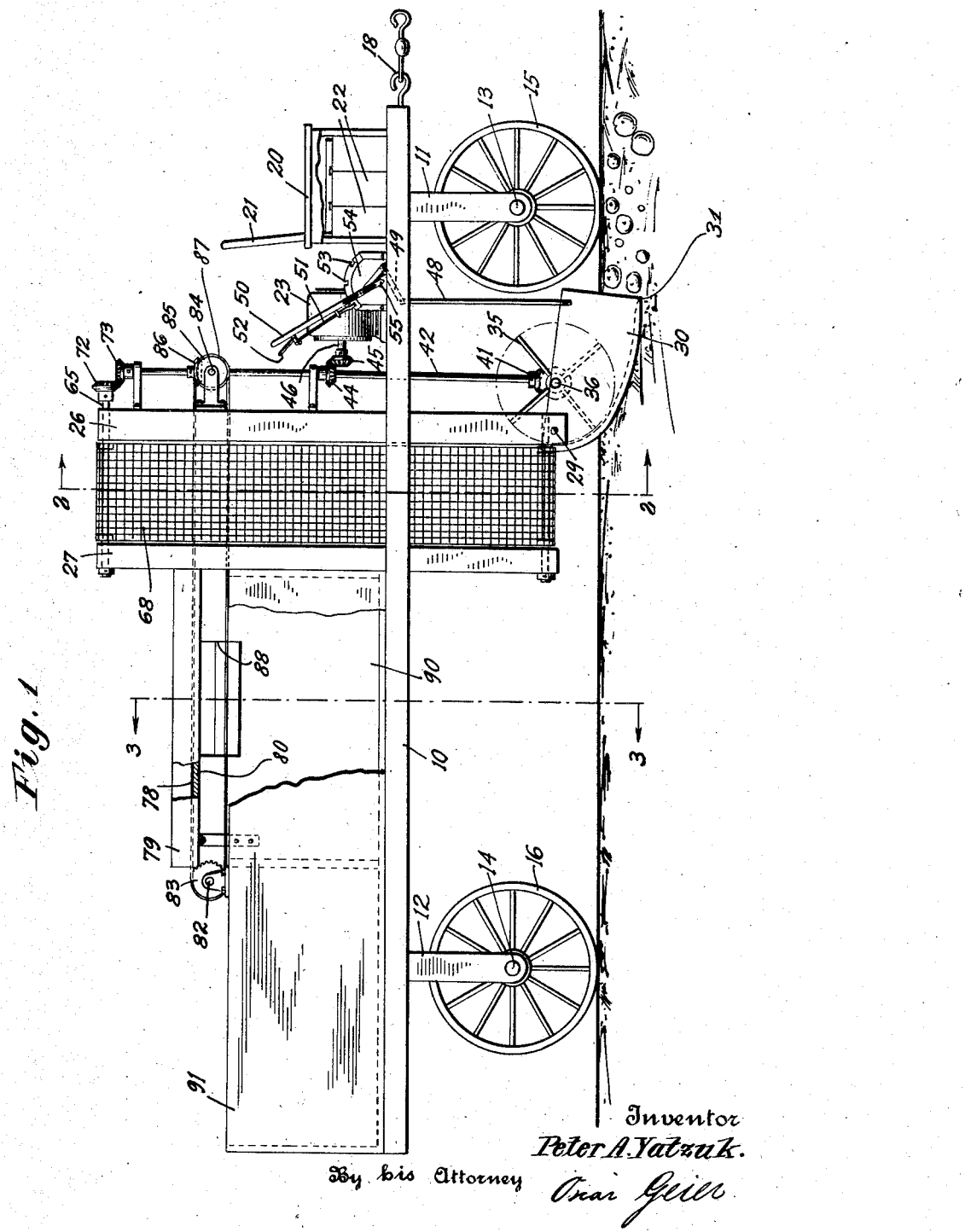
Figure 1 is a side elevation of a potato digger, made in accordance with the invention, parts broken away, in order to disclose the interior.

The implement comprises a platform 10 mounted upon supports 11 and 12 carrying axles 13 and 14, rotatably engaged in wheels 15 and 16, the wheels being provided with wide tires, so as to prevent them from entering below the surface of the soil, and are placed so as to straddle the potato plants which are being operated upon.

Arranged in front of the platform 10 are ordinary connections 18 to which may be attached draft animals in the usual manner.

Fixed upon the platform is a seat 20 provided with a back 21, while in the space below the seat are arranged the cells 22 of a storage battery connected in such manner as to operate an electric motor 23, used in actuating the mechanism.

Engaged with the platform are two pairs of vertical columns 26 and 27, their lower ends extending downward so as to clear the surface of the soil, and secured in them on the pins 29, is a scoop or shovel 30 the bottom of which is formed with a sharp front edge 31 while at the rear, in the upwardly curved end 32, are formed a plurality of slots 33, of such width as to allow dirt, sand and gravel to pass through but prevent the passage of potatoes.

The material gathered by the scoop is acted upon by the blades 35 of an agitator fixed upon a transverse shaft 36 journaled in the sides of the scoop 30, the shaft extending through at one side and having fixed upon it a bevel gear 40 meshing with a mating gear 41 secured to the lower end of a vertical shaft 42 extending up through the platform and having upon it another miter gear 44, connecting with the gear 45, fixed upon the shaft 46, of the motor 23; thus as the motor is operated the paddle blades are given a rotary motion in an obvious manner.

Engaged with the front end of the scoop 30, is a link 48 pivotally connected at its upper end with a lever 49, having a long angular arm, 50 adapted to be manually operated, and engaged on the lower side of the lever 50 is a detent 51, having an actuating handle 52 the detent being engageable within openings 53 formed in an arcuate element 54 the center of which is coincident with the pivotal point of the operating lever 50, thus providing means for adjusting the scoop 30 and also for holding the same in adjustment.

Extending from side to side within the scoop 30, at its upper front part, is a bar 58, containing a longitudinal recess 59, the lower wall 60 being further extended and formed into teeth having spaces 62 in which operate knives or cutters 63, fixed on a chain 64 mounted on rollers at the sides of the scoop and caused to travel circuitously and continuously by connections with the motor 23, the arrangement being such as to shear the plants closely to their roots.

Figure 2:
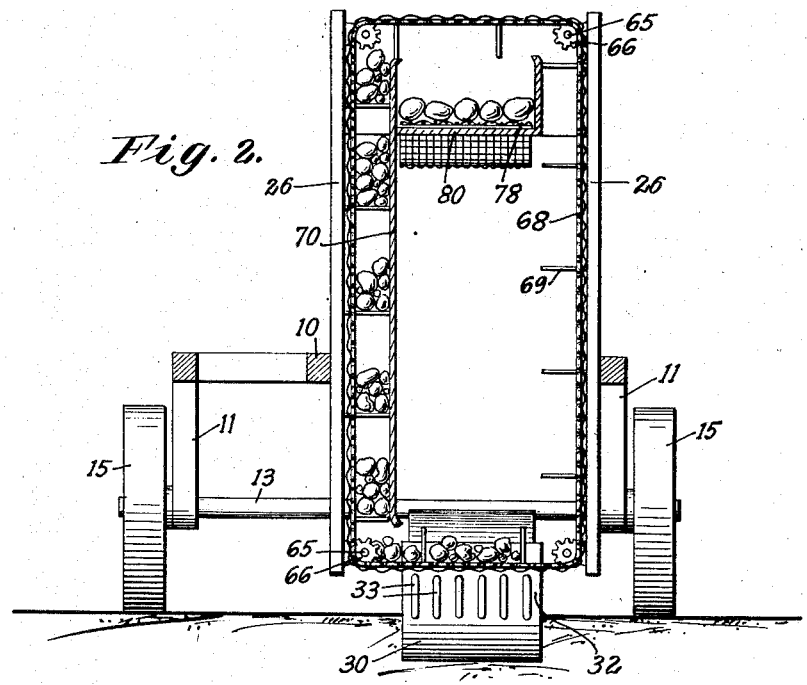
Fig. 2 is a vertical section view taken on line 2—2 of Fig. 1.
Figure 3:
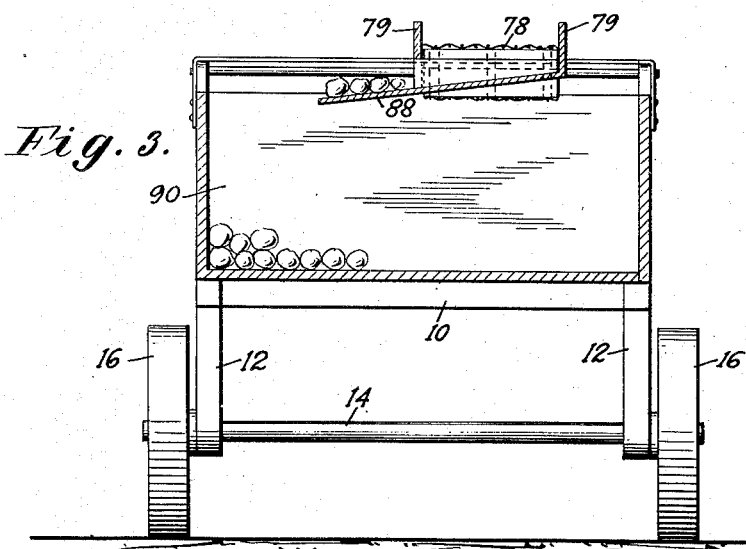
Fig. 3 is a similar vertical sectional view taken on line 3—3 of Fig. 1.

Mounted in the uprights 26 and 27, at the tops and bottoms thereof, are spindles 65 carrying sprockets 66, over which runs an endless conveyer 68, provided with inwardly extending fingers 69, the conveyer moving circuitously in a path like a parallelogram, the rising side being adjacent to a fixed vertical plate 70 which is adapted to prevent articles raised by the fingers 69 from rolling off, as can be seen in Fig. 2.

One of the spindles 65 extends through the front of the frame and has secured upon it a bevel gear 72 meshing with a mating gear 73 fixed upon the vertical spindle 42 so that its rotary motion is caused to operate the conveyer, raising the vegetables and depositing the same upon the surface of another conveyer 78 moving between side plates 79 the conveyer traveling in a horizontal path longitudinally over the plate 80 with which the vegetables make contact.

The vegetables are moved rearwardly by the horizontal conveyer 78, which runs over a rear spindle 82, driven by a sprocket wheel 83 operated by a chain driven by the front sprocket 85 on the spindle 84.

Also on the front spindle 84 is a bevel gear 87, meshing with a mating gear 86, fixed upon the upper end of the vertical shaft 42. The plate 80 extends rearwardly to a chute 88 upon which the smaller potatoes drop, passing through the grating of the conveyer 78 and entering a compartment 90 arranged midway of the truck, while the larger potatoes are conveyed to a similar compartment 91 at the extreme rear of the platform 10.

From the foregoing description it will be seen that a mechanism has been disclosed which trims the leaves and stems of the plant, raising the potatoes from the ground and separating them from the soil, conveying and assorting them and eventually delivering them into compartments holding the assorted sizes in a convenient manner.

Having thus described my invention, what I claim is new and desire to secure by Letters Patent, is—

In a separator as described, a frame, uprights mounted in said frame, spindles mounted at the top and bottom of said uprights, sprockets carried by said spindles, an endless screening conveyer moving in a path substantially like a parallelogram, inwardly extending fingers on said conveyer, and a vertical plate forming with said uprights and fingers compartments for the articles separated, and a horizontal screening conveyer to which the potatoes from the vertical conveyer are transferred, and a chute adapted to deliver the potatoes not passing through the screening conveyer to a collector compartment, substantially as described.

In testimony whereof I have affixed my signature.

PETER A. YATZUK.